No. 849,807.
PATENTED APR. 9, 1907.
W. F. PAGEL.
GASOLENE INDICATOR.
APPLICATION FILED MAR. 23, 1906.
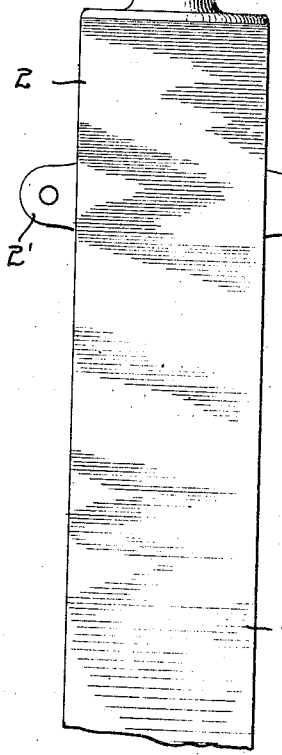
FIG.2.
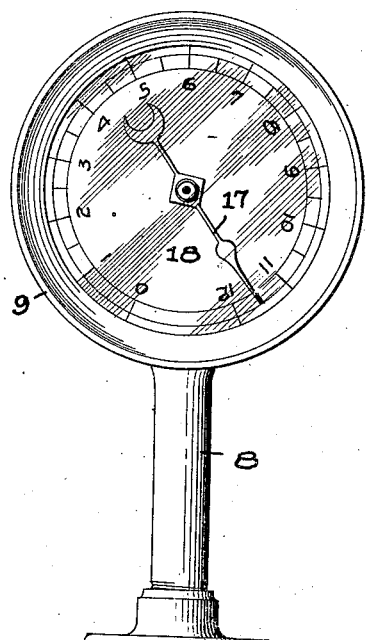
FIG.3.
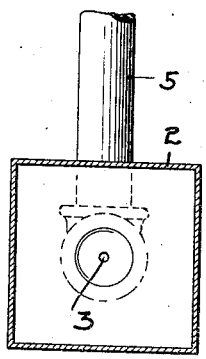
FIG.4.
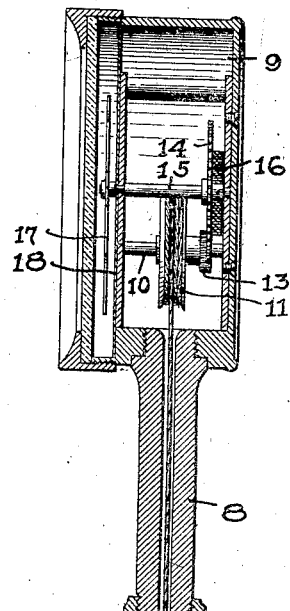
FIG.1.
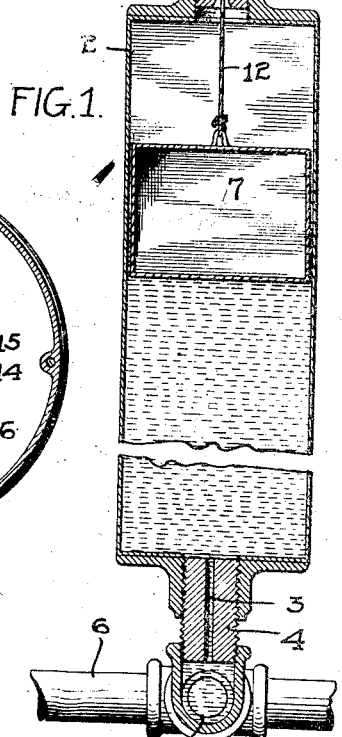
WITNESSES
M. McInnis
O. J. Hanson
INVENTOR
WILLIAM F. PAGEL
BY
Paul & Paul
HIS ATTORNEYS

UNITED STATES PATENT OFFICE.

WILLIAM F. PAGEL, OF MINNEAPOLIS, MINNESOTA.

GASOLENE-INDICATOR.

No. 849,807.   Specification of Letters Patent.   Patented April 9, 1907.

Application filed March 23, 1906. Serial No. 307,622.

*To all whom it may concern:*

Be it known that I, WILLIAM F. PAGEL, of Minneapolis, Hennepin county, Minnesota, have invented certain new and useful Improvements in Gasolene-Indicators, of which the following is a specification.

This invention relates to improvements in indicators designed especially for use upon automobiles to show at a glance the amount of gasolene in the storage-tank, though the device is capable of other uses.

The invention consists generally in the constructions and combinations hereinafter described, and particularly pointed out in the claims.

In the accompanying drawings, forming part of this specification, Figure 1 is a vertical section of an indicator embodying my invention. Fig. 2 is a front elevation. Fig. 3 is a section through the indicator-casing on a plane at right angles to the plane of Fig. 1. Fig. 4 is a transverse section of the lower casing.

In the drawings, 2 represents a casing, which is here shown as of rectangular form in cross-section, but which may be of any other form, if preferred. This casing is preferably provided with suitable lugs 2', by means of which it may be attached to the dashboard of an automobile or secured to any other suitable support. This casing has a small hole 3 in its lower end and is connected by a coupling 4 and branch pipe 5 to the pipe 6, supplying gasolene to the carbureter, or, if preferred, it may be connected in any other suitable manner with the gasolene-tank, so that the gasolene will rise in the casing 2 to the same level that it rises in the tank. Arranged in the casing 2 is a float 7, that rests upon the gasolene therein and rises and falls therewith.

Upon the casing 2 is a hollow standard 8, and this standard supports the dial-casing 9. Mounted in the casing 9 is a shaft 10, carrying a pulley 11, and a cord 12 is wound on this pulley and passing down through the standard 8 has its lower end connected to the float 7. The shaft 10 is also provided with a pinion 13, that meshes with a gear 14 on a second shaft 15. A clock-spring 16 has one end connected to the shaft 15 and the other end to the casing. The shaft 15 is arranged centrally in the casing 9 and carries a hand 17, which is arranged in front of the dial 18, over which said hand is adapted to travel. The dial 18 is graduated and marked, so that the position of the hand will indicate the number of gallons of gasolene in the tank. As the gasolene falls in the casing 2 the float descends and unwinds the cord from the pulley 11 and turns the shaft, and thereby moves the hand over the dial. This movement winds up the spring 16. When the gasolene rises in the casing 2, carrying the float with it, the spring 16 unwinds, turning the hand to the point on the dial indicating the amount of gasolene in the tank and winding up the cord 12.

The hand and dial will at all times show exactly the amount of gasolene in the tank. As the hole in the bottom of the casing is very small, the gasolene flows into and out of this casing very slowly, and the float and indicator are not affected by any sudden jolting to which the car may be subjected.

The details of the construction may be varied in many particulars without departing from my invention.

I claim as my invention—

1. The combination, with the casing 2, having an aperture in its bottom permitting liquid to flow into and out of said casing, of a float arranged in said casing, a dial-casing supported upon said casing 2, shafts mounted in said casing and geared together, an indicator-hand mounted on one of said shafts, a spring connected to said indicator-hand shaft, a pulley provided on the other shaft, and means connecting said float and said pulley.

2. The combination, with the casing 2, and the supply-pipe 6 to which said casing is connected, of the hollow standard 8, the dial-casing supported on said standard, a float arranged in said casing, shafts 10 and 15 mounted in said casing and geared together, the hand mounted on the shaft 15, the clock-spring connected to said shaft, the pulley 11 on the shaft 10 and the cord connected to said pulley and passing through said hollow standard and connected to said float, substantially as described.

In witness whereof I have hereunto set my hand this 21st day of March, 1906.

WILLIAM F. PAGEL.

Witnesses:
C. G. HANSON,
M. McINNIS.